(12) United States Patent
Thomas

(10) Patent No.: US 7,654,284 B1
(45) Date of Patent: Feb. 2, 2010

(54) FLUID DRAINING MANIFOLD FOR ROOFS AND ASSOCIATED METHOD

(76) Inventor: Leeford Thomas, P.O. Box 863505, Ridgewood, NY (US) 11386

( * ) Notice: Subject to any disclaimer, the term of this patent is extended or adjusted under 35 U.S.C. 154(b) by 0 days.

(21) Appl. No.: 12/322,753

(22) Filed: Feb. 7, 2009

Related U.S. Application Data

(63) Continuation-in-part of application No. 11/426,115, filed on Jun. 23, 2006, now abandoned.

(60) Provisional application No. 60/693,479, filed on Jun. 24, 2005.

(51) Int. Cl.
*F16K 11/22* (2006.01)
*F16K 1/00* (2006.01)
*F16L 5/00* (2006.01)
*E02D 19/00* (2006.01)

(52) U.S. Cl. .................. 137/606; 137/861; 137/357; 52/169.5

(58) Field of Classification Search ............ 137/561 A, 137/561 R, 599.03, 602, 605, 606, 861, 597, 137/357, 375, 236.1; 52/302.1, 169.5, 11
See application file for complete search history.

(56) References Cited

U.S. PATENT DOCUMENTS

| | | | | |
|---|---|---|---|---|
| 494,061 A | * | 3/1893 | Day | 137/12.5 |
| 593,080 A | * | 11/1897 | Case | 62/390 |
| 3,185,213 A | | 5/1965 | Wilhem | |
| 3,664,372 A | * | 5/1972 | Marshall | 137/552 |
| 4,112,972 A | * | 9/1978 | Lajeuness | 137/597 |
| 4,252,183 A | | 2/1981 | Ricciardelli | |
| 5,735,304 A | * | 4/1998 | Chumley | 137/15.01 |
| 5,842,308 A | | 12/1998 | Turner | |
| 5,960,590 A | | 10/1999 | Hutchison | |
| 6,209,574 B1 | | 4/2001 | Prewitt | |
| 2004/0231837 A1 | * | 11/2004 | Zank et al. | 166/125 |
| 2008/0236677 A1 | * | 10/2008 | Chen et al. | 137/455 |

* cited by examiner

*Primary Examiner*—Stephen Hepperle
*Assistant Examiner*—Atif H Chaudry

(57) ABSTRACT

A fluid draining manifold includes a central shaft that defines a horizontally registered first passageway and is provided with opposed open ends. The central shaft includes a semi-circular ring anchored to one open end for receiving a locking member, prohibiting unauthorized removal of the apparatus. Outwardly flanged auxiliary shafts are coupled to the central shaft and have linear lengths. Each auxiliary shaft defines an isolated auxiliary passageway in fluid communication with the first passageway. Each auxiliary passageway has opposed open ends in fluid communication with the first passageway such that fluid and debris is directed into the central shaft after traveling through the auxiliary shafts. A discharge shaft is abutted to the central shaft and is in fluid communication with the auxiliary shafts. The discharge shaft has offset open ends formed therein such that fluid and debris converges towards the lower open end prior to exiting the apparatus.

16 Claims, 6 Drawing Sheets

FLUID DRAINING MANIFOLD FOR ROOFS AND ASSOCIATED METHOD

CROSS REFERENCE TO RELATED APPLICATIONS

This application is a continuation-in-part of U.S. patent application Ser. No. 11/426,115, filed Jun. 23, 2006 now abandoned, which claims the benefit of U.S. Provisional Application No. 60/693,479, filed Jun. 24, 2005, now abandoned. The entire disclosures of U.S. patent application Ser. No. 11/426,115 and U.S. Provisional Application No. 60/693,479 are incorporated herein by reference.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND OF THE INVENTION

1. Technical Field

This invention relates to fluid draining apparatuses and, more particularly, to a fluid draining manifold for selectively channeling water and debris downwardly into an existing roof gutter.

2. Prior Art

Virtually all homeowners with trees adjacent to their houses or in the near vicinity are familiar with the problem of clogged rain gutters and down spouts, a problem which is especially prevalent every spring and autumn. One of the first chores home owners have to attend to every spring is clearing clogged gutters and down spouts of a winter's worth of leaves, branches and accumulated debris. In northern areas, this buildup is often the cause of ice jams during freezing weather, which in turn can cause water infiltration under roof shingles and eventual roof-deck or interior home damage. During the fall, homeowners are again faced with the problem of debris-clogged gutters, along with overgrown perennial beds and growing blanket of leaves on the lawn. Such chores can be tedious and cleaning gutters can be risky as it usually entails teetering on a ladder while clawing hunks of matted leaves from clogged gutters.

Until recently, the only alternative to gutter problems was to have no gutters at all on your home, but this only leads to other problems. Rainwater pouring off a roof can damage shrubs and wash away grading around a house, which is one of the principal causes of wet basements that can lead to more serious and costly foundation damage. Yet, as advantageous as gutters can be, they sometimes cannot help homes with flat or little-sloping roofs. Unfortunately, these types of structures face the problem of poor drainage, which leads to standing water on the roofs. Over time, this can cause expensive damage to the structure and lead to leaks into the interior of the home. Obviously, it would be advantageous to provide a means for preventing water accumulation on a roof.

Accordingly, a need remains for a fluid draining manifold for roofs in order to overcome the above-noted shortcomings. The present invention satisfies such a need by providing a draining apparatus that is convenient and easy to use, is lightweight yet durable in design, is easy to produce, and improves excess water drainage from roofs that are flat or have little slope. Working in conjunction with an existing gutter system, this manifold apparatus effectively eliminates the risk of standing water damage to roofs and other structural components. As a result, users are able to avoid time-consuming and costly home repairs that result from crumbling roofs and interior water damage from leaks. The apparatus enhances the flow of water once it enters the three conduits thereof, rapidly channeling the water through the cross-section and out of the spout into the gutter.

BRIEF SUMMARY OF THE INVENTION

In view of the foregoing background, it is therefore an object of the present invention to provide a fluid draining manifold for roofs. These and other objects, features, and advantages of the invention are provided by a portable fluid draining manifold positional on a roof for channeling water and debris downwardly into an existing gutter.

A portable fluid draining manifold positional on a roof for channeling water and debris downwardly into an existing gutter may include a primary shaft including a first passageway and a plurality of outwardly flanged auxiliary shafts removably coupled to the primary shaft. Each of the auxiliary shafts may have a linear longitudinal length registered along a unique axis that may be coplanar with a central portion of the primary shaft. While the primary shaft may be positioned in an existing gutter, the auxiliary shafts may be positioned on a user's roof to gather water thereon and direct the water into the gutter. This may advantageously assist a user in removing water from the roof so as not to allow large volumes of water to build up and cause roof damage.

Additionally, a mechanism may be included for redirecting fluid along alternate travel paths that are transversely bridged between the auxiliary shafts. In this manner, a concentrated stream of fluid may be redirected to the central shaft when at least one of the auxiliary shafts are clogged with debris. This is vital and advantageous in allowing continued use of the apparatus even when common debris such as leaves, sticks, or dirt gathers in the auxiliary shafts.

Further, the first passageway may be registered transversely to the respective longitudinal lengths of the auxiliary shafts. The manifold may include first, second, and third auxiliary shafts defining first, second, and third auxiliary passageways leading towards the first passageway. Thus, the water may run off the roof through the auxiliary passageways and be directed through the primary passageway, out of the primary shaft, and into the gutter to be expelled from the rooftop.

The fluid redirecting mechanism may further include a primary valve intermediately situated at the primary shaft and located downstream of the first passageway. Such a valve may permit the user to adjust the flow rate of water coming out of the primary shaft into the gutters, or simply shut off the water flow entirely. In addition, the mechanism may include first, second and third auxiliary valves situated within proximal ends of the first, second and third auxiliary passageways respectively which may be disposed upstream of the first passageway. These valves may advantageously allow a user to choose which auxiliary shafts permit the flow of water at any given time. Further, the valves may allow the user to close one shaft to thereafter clean debris that may have gathered inside thereof.

A first fluid transfer shaft may be connected to the first and second auxiliary shafts respectively and spaced from the third auxiliary shaft. Further, a second fluid transfer shaft may be connected to the second and third auxiliary shafts respectively and spaced from the first auxiliary shaft. Additionally, the first and second fluid transfer shafts may define first and second fluid transfer passageways that selectively redirect fluid between the first, second and third auxiliary shafts prior to reaching the primary shaft. The fluid transfer shafts provide the unexpected and unpredictable benefit of redirecting water from one auxiliary shaft to another at times when debris may have blocked the waters ability to travel through the first shaft. Thus, the apparatus may continue to perform its intended function of draining water from the rooftop even when leaves or other debris have temporarily blocked one passageway.

The fluid draining manifold may also include a first travel path of the alternate travel paths terminating prior to reaching a distal portion of the first auxiliary shaft. In this manner, the fluid may be redirected to a proximal portion of the second auxiliary shaft prior to reaching the primary shaft. Further, a second travel path of the alternate travel paths may terminate prior to reaching a distal portion of the second auxiliary shaft such that fluid may be redirected to proximal portions of the first and third auxiliary shafts prior to reaching the primary shaft. Additionally, a third travel path of the alternate travel paths may terminate prior to reaching a distal portion of the third auxiliary shaft such that fluid may be redirected to a proximal portion of the second auxiliary shaft prior to reaching the primary shaft. This unexpected benefit provided by the apparatus ensures the flow of water is redirected when individual auxiliary shafts become blocked, a feature not rendered obvious by one skilled in the art.

The fluid draining manifold may further include each of the first, second and third auxiliary shafts having an access panel located at a distal end thereof for permitting a user to access and remove debris from the first, second and third passageways during periodic maintenance respectively. The access panel advantageously permits removal of debris without having to dismantle the apparatus to reach sticks or leaves that may be lodged farther down into the shaft. In addition, each of the first, second and third auxiliary shafts may be removably and independently coupled to the primary shaft. This may allow the user to remove and reposition the auxiliary shafts as desired and perform extensive cleanings when needed.

Additionally, the fluid draining manifold may include a plurality of flexible auxiliary conduits removably attached directly to proximal ends of the auxiliary shafts to thereby receive and channel fluid directly to the auxiliary shafts respectively. The flexible auxiliary conduits provide the unexpected and unpredictable benefit of allowing the apparatus to reach areas of the rooftop otherwise not accessible, thereby assisting in removal of water from various parts of the user's roof.

The manifold may further include a flexible primary conduit removably attached directly to the primary shaft to thereby receive and channel fluid away from the primary shaft. Such a flexible primary conduit may advantageously direct water into vertical sections of the gutter system to further assist in quickly removing water from the roof. Also, a discharge nozzle may be included and coupled to the primary conduit to thereby outwardly distribute the fluid in a diverging pattern away from the primary shaft. This may be used not only to expel water from the roof, but also may provide the benefit of allowing the user to direct water to desired areas, such as to plants or flowers beneath the eaves of the roof that would otherwise not receive water during rainfall.

The present invention may further include a method for channeling water and debris downwardly from a roof into an existing gutter. Such a method may include the chronological steps of first providing a primary shaft including a first passageway. Second, the method may entail providing and removably coupling a plurality of outwardly flanged auxiliary shafts to the central shaft. Next, the method may include arranging the auxiliary shafts in such a manner that each of the auxiliary shafts has a linear longitudinal length registered along a unique axis that is coplanar with a central portion of the primary shaft.

Finally, the method may include, when at least one of the auxiliary shafts is clogged with debris, redirecting a concentrated stream of fluid to the central shaft by redirecting fluid along alternate travel paths that are transversely bridged between the auxiliary shafts. The first passageway may be registered transversely to the respective longitudinal lengths of the auxiliary shafts.

The method combined with the present invention provides the unexpected and unpredictable benefit of permitting a user to easily remove water from a rooftop before damage is caused by excessive water accumulation. The auxiliary shafts may advantageously gather water from remote locations on the rooftop and direct the water toward the primary shaft to be dispersed in the gutter system. The fluid transfer shafts may assist in directing water from one auxiliary shaft to another at times when debris has blocked the first shaft, and the access panels may permit a user to quickly remove the debris without dismantling the apparatus. The important features provide benefits not rendered obvious by one skilled in the art.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

It is noted the purpose of the foregoing abstract is to enable the U.S. Patent and Trademark Office and the public generally, especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE SEVERAL VIEWS OF THE DRAWING

The novel features believed to be characteristic of this invention are set forth with particularity in the appended claims. The invention itself, however, both as to its organization and method of operation, together with further objects and advantages thereof, may best be understood by reference to the following description taken in connection with the accompanying drawings in which:

DETAILED DESCRIPTION OF THE INVENTION

Figure 1:
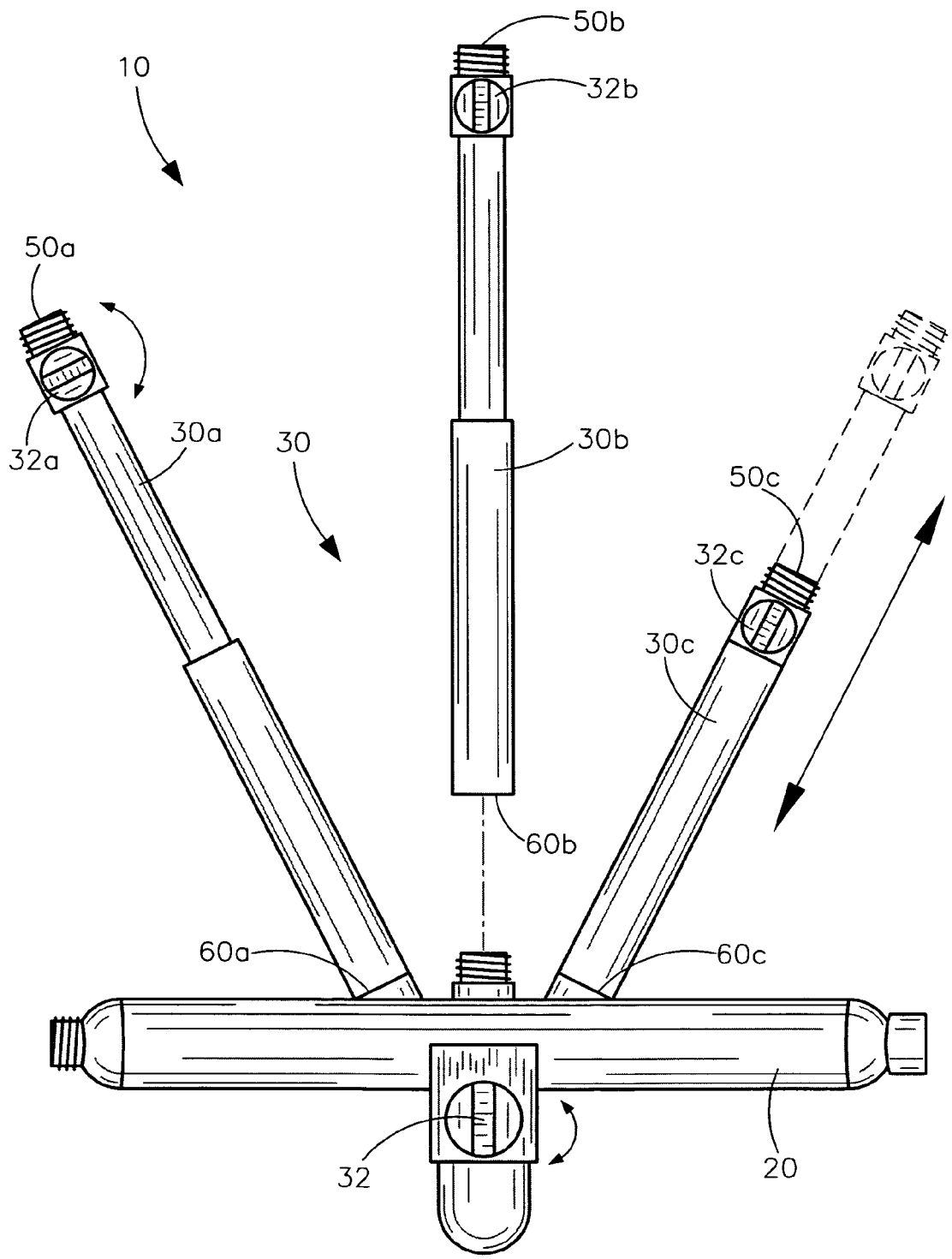
FIG. 1 is a top plan view showing one embodiment of a fluid draining manifold for roofs, in accordance with the present invention.
Figure 2:
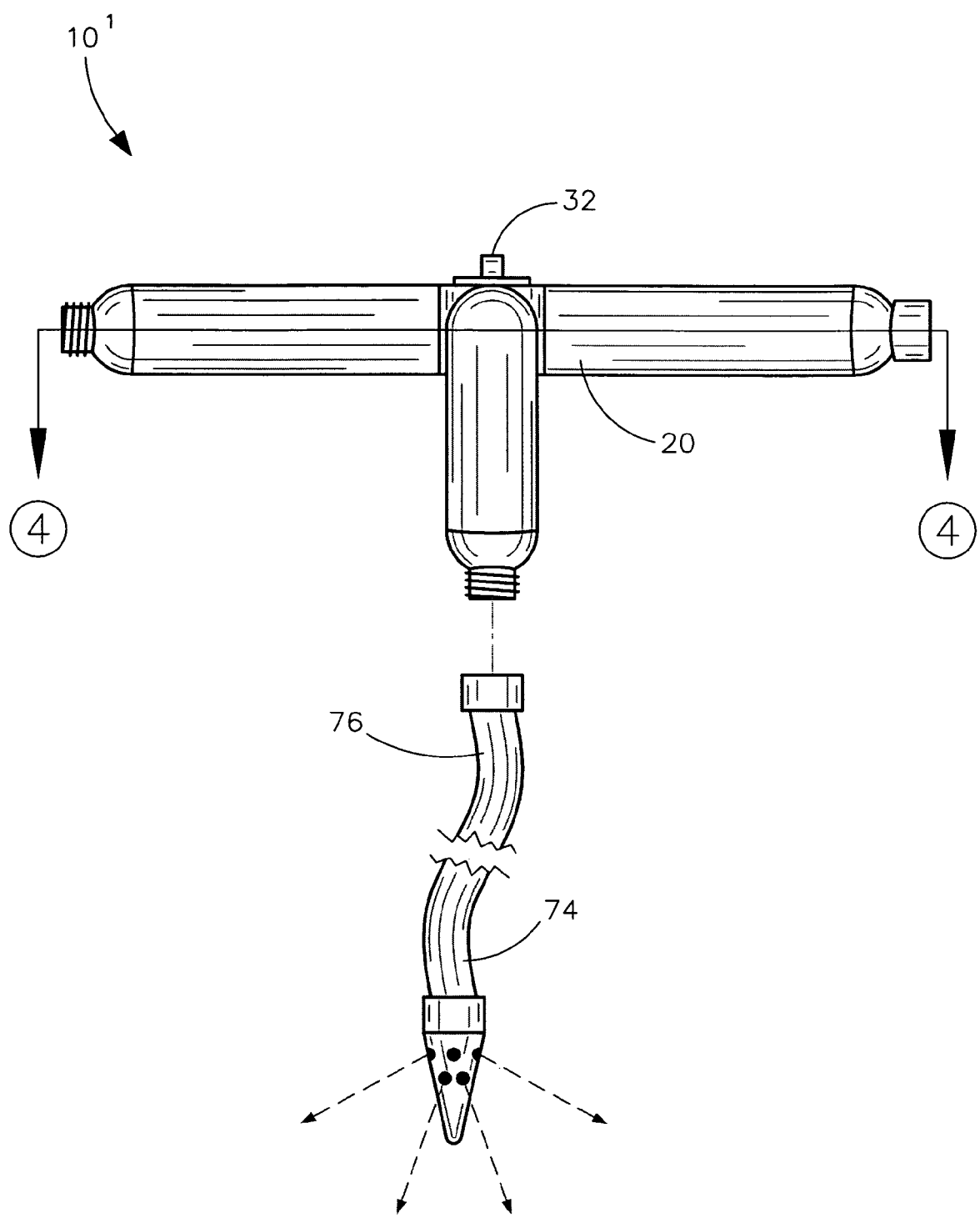
FIG. 2 is a front elevational view showing an alternate embodiment of the apparatus shown in FIG. 1.
Figure 3:
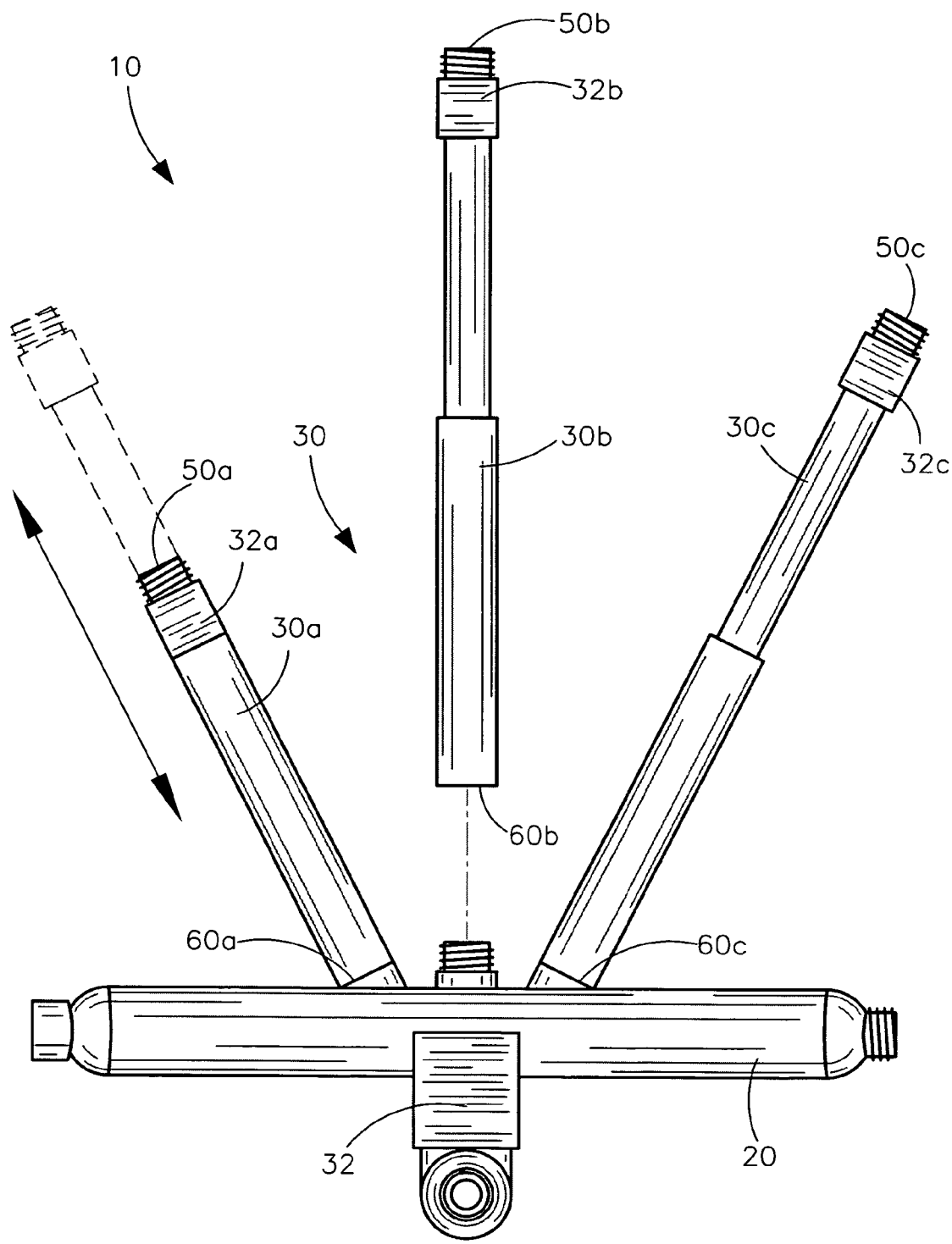
FIG. 3 is a bottom plan view of the embodiment shown in FIG. 1.

The present invention will now be described more fully hereinafter with reference to the accompanying drawings, in which a preferred embodiment of the invention is shown. This invention may, however, be embodied in many different forms and should not be construed as limited to the embodiment set forth herein. Rather, this embodiment is provided so that this application will be thorough and complete, and will fully convey the true scope of the invention to those skilled in the art. Like numbers refer to like elements throughout the figures. Prime notations designate alternate embodiments of the present invention.

The apparatus of this invention is referred to generally in FIGS. 1-6 by the reference numerals 10 and is intended to provide a fluid draining manifold for roofs. It should be understood that the apparatus 10 may be used to drain fluids from many different types of surfaces and structures, and should not be limited in use to only draining fluid from roofs.

Referring initially to FIGS. 1, 3, 5 and 6, a portable fluid draining manifold 10 is shown, which is capable of being adjustably positioned on a roof for channeling water and debris downwardly into an existing gutter. Such a fluid draining manifold 10 may include a primary shaft 20 including a first passageway and a plurality of outwardly flanged auxiliary shafts 30 removably coupled to the primary shaft 20. Each of the auxiliary shafts 30 may have a linear longitudinal length registered along a unique axis that may be coplanar with a central portion of the primary shaft 20. While the primary shaft 20 may be positioned in an existing gutter, the auxiliary shafts 30A, 30B, 30C (collectively identified at 30) may be positioned on a roof surface to receive and direct water into a central path and ultimately into a gutter. This advantageously assists a user in removing water from the roof so as not to allow large volumes of water to build up and cause roof damage.

Figure 4:
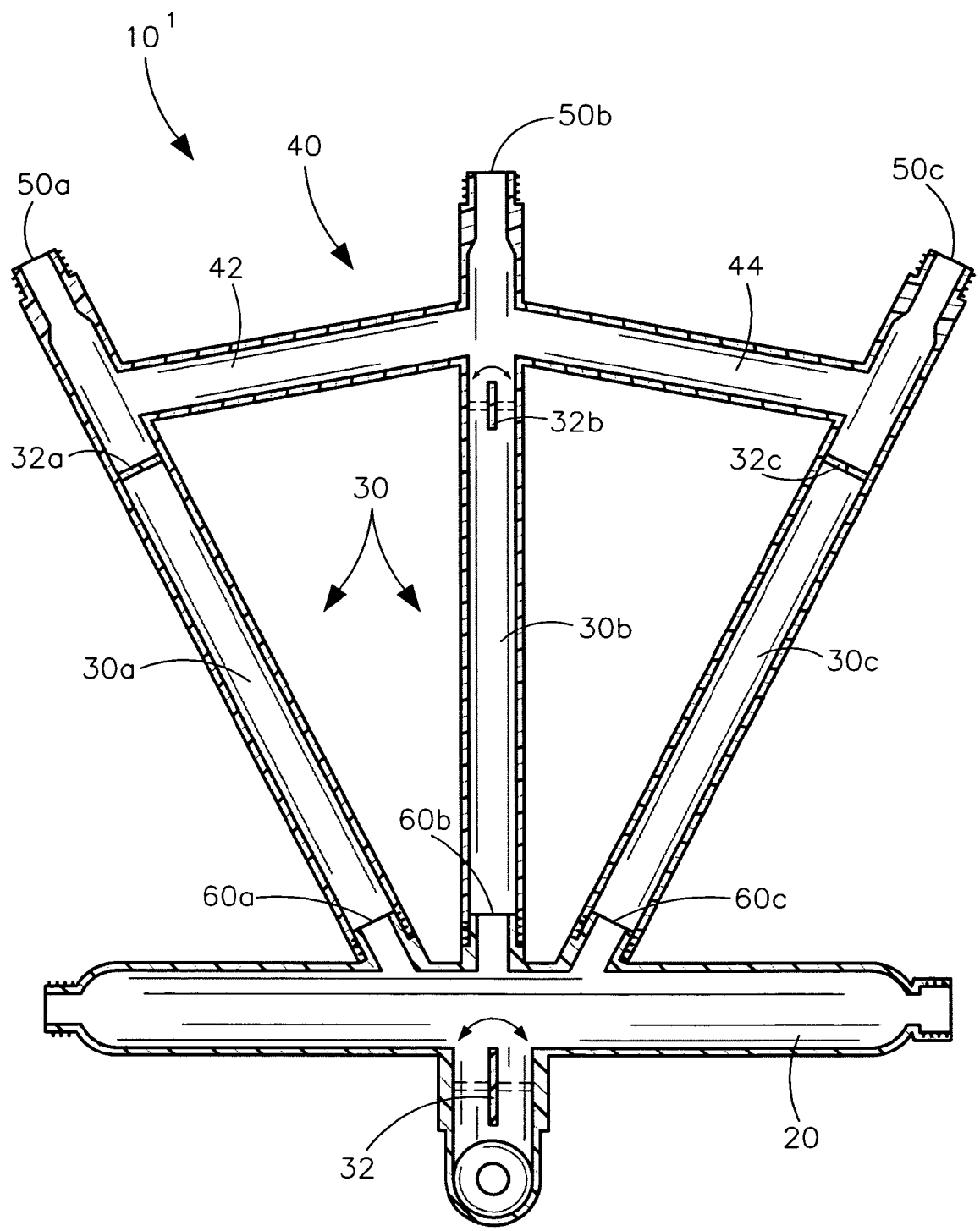
FIG. 4 is a cross-sectional view of the embodiment shown in FIG. 2, taken along line 3-3.
Figure 5:
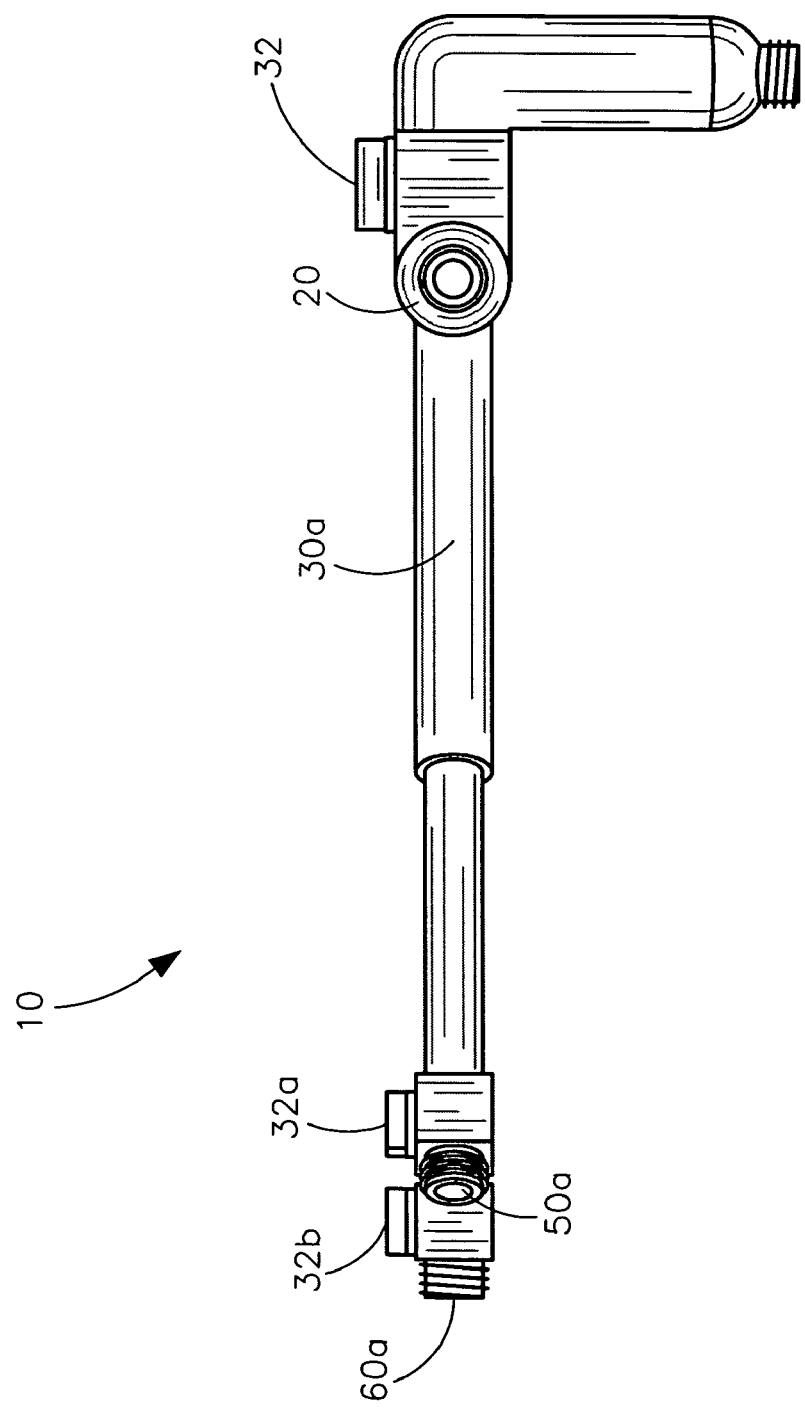
FIG. 5 is a side elevational view of the embodiment shown in FIG. 1.
Figure 6:
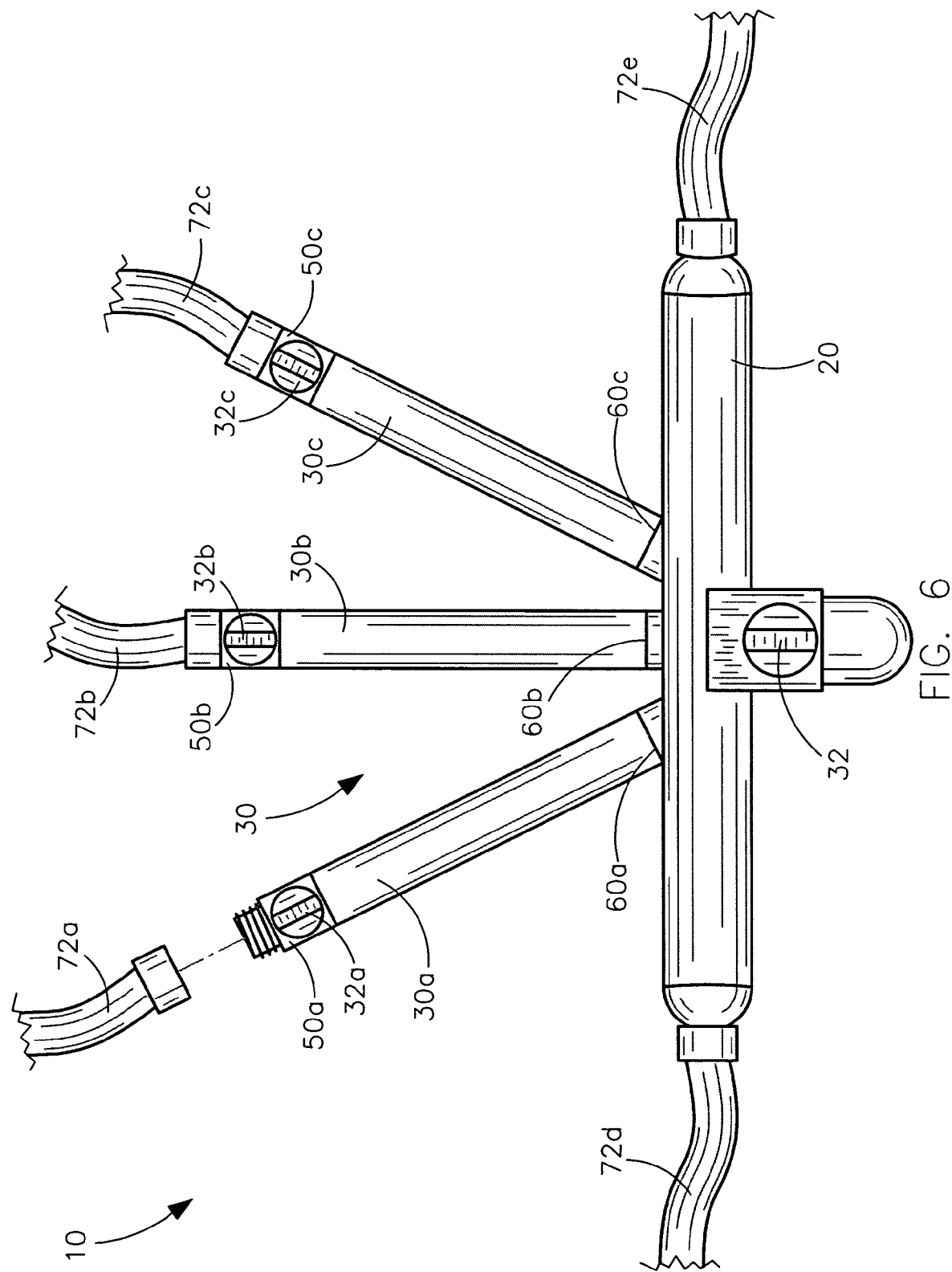
FIG. 6 is a top plan view of the embodiment shown in FIG. 1, wherein flexible conduits are removably coupled to the auxiliary shafts.

Referring to FIGS. 4 and 6, an alternate embodiment 10' of the present invention may include a mechanism 40 for redirecting fluid along alternate travel paths that are transversely bridged between auxiliary shafts 30A and 30B or 30B and 30C, for example. Also, an alternate travel path may be defined as leading from auxiliary shafts 30A and 30C into auxiliary shaft 30B, for example. In this manner, a concentrated stream of fluid may be redirected to the primary shaft 20 when at least one of the auxiliary shafts 30 are clogged with debris. This is vital and advantageous in allowing continued use of the apparatus 10 even when common debris such as leaves, sticks, or dirt gathers in the auxiliary shafts 30.

As seen in FIGS. 1-6, a first passageway (associated with primary shaft 20) may be registered transversely to the respective longitudinal lengths of the auxiliary shafts 30A, 30B, 30C. The first, second, and third auxiliary shafts 30A, 30B, 30C preferably define first, second, and third auxiliary passageways leading towards the first passageway. Thus, the water may run off the roof and enter through the auxiliary passageways and then be directed through the primary passageway, out of the primary shaft 20, and into an existing gutter to be expelled from the rooftop.

Referring back to FIGS. 1, 3, 5 and 6, the fluid redirecting mechanism 40 may further include a primary valve 32 intermediately situated at the primary shaft 20 and located downstream of the first passageway. Such a valve 32 permits the user to adjust the flow rate of water coming out of the primary shaft 20 into the gutters, or simply shut off the water flow entirely. In addition, mechanism 40 may include first, second and third auxiliary valves 32A, 32B, 32C situated within proximal ends 60A, 60B, 60C of the first, second and third auxiliary passageways respectively which may be disposed upstream of the first passageway.

Such valves 32A, 32B, 32C advantageously allow a user to choose which auxiliary shafts 30A, 30B, 30C permit the flow of water at any given time. Further, valves 32A, 32B, 32C may allow the user to close one shaft to thereafter clean debris that may have gathered inside thereof, via access panels 70A, 70B, 70C, respectively.

Referring back to FIG. 4, the alternate embodiment 10' is shown as having a first fluid transfer shaft 42 may be connected to the first and second auxiliary shafts 30A, 30B respectively and spaced from the third auxiliary shaft 30C. Further, a second fluid transfer shaft 44 may be connected to the second and third auxiliary shafts 30B, 30C respectively and spaced from the first auxiliary shaft 30A. Additionally, the first and second fluid transfer shafts 42, 44 may define first and second fluid transfer passageways that selectively redirect fluid between the first, second and third auxiliary shafts 30A, 30B, 30C prior to reaching the primary shaft 20.

The fluid transfer shafts 42, 44 provide the unexpected and unpredictable benefit of redirecting water from one auxiliary shaft to another auxiliary shaft when debris blocks the water's ability to reach the primary shaft 20. Thus, the apparatus 10 may continue to perform its intended function of draining water from the rooftop even when leaves or other debris have temporarily blocked one passageway, because the water is redirected to an unblocked passageway.

Still referring to FIG. 4, it is understood that a first travel path of the alternate travel paths terminates prior to reaching a distal portion 50A of the first auxiliary shaft 30A, when the first valve 32A is articulated to a closed position. In this manner, the fluid may be redirected to a proximal portion 60B of the second auxiliary shaft 30B prior to reaching the primary shaft 20. Further, a second travel path of the alternate travel paths may terminate prior to reaching a distal portion 50A of the second auxiliary shaft 30B, when the second valve 32B is articulated to a closed position, such that fluid may be redirected to proximal portions 60A, 60C of the first and third auxiliary shafts 30A, 30C prior to reaching the primary shaft 20.

Additionally, a third travel path of the alternate travel paths may terminate prior to reaching a distal portion 50C of the third auxiliary shaft 30C, when valve 32C is articulated to a closed position, such that fluid may be redirected to a proximal portion 60B of the second auxiliary shaft 30B prior to reaching the primary shaft 20. This unexpected benefit provided by the fluid redirecting mechanism 40 ensures the flow of water is redirected when individual auxiliary shafts 30A, 30B, 30C become blocked, a feature not rendered obvious by one skilled in the art.

As can be seen in FIG. 4, each of the first, second and third auxiliary shafts 30A, 30B, 30C may have an access panel 70A, 70B, 70 C located at a distal end 50A, 50B, 50C thereof for permitting a user to access and remove debris from the first, second and third passageways during periodic maintenance respectively. The access panels 70A, 70B, 70C advantageously permit removal of debris without having to disconnect auxiliary shafts 30A, 30B, 30C from primary shaft 20. Thus, sticks or leaves that may be lodged further down towards distal ends 60A, 60B, 60C, may be removed while water simultaneously travels along at least one of the alternate travel paths and deposits into primary shaft 20. Of course, each of the first, second and third auxiliary shafts 30A, 30B, 30C may be removably and independently coupled to the primary shaft 20. This allows the user to remove and reposition the auxiliary shafts 30A, 30B, 30C as desired and perform extensive cleanings when needed.

Additionally, the fluid draining manifold 10 may include a plurality of flexible auxiliary conduits 72A-72C removably attached directly to proximal ends 60A-60C of the auxiliary shafts 30 to thereby receive and channel fluid directly to the auxiliary shafts 30A-30C, respectively. Additionally, flexible auxiliary conduits 72A-72C provide the unexpected and unpredictable benefit of allowing the apparatus 10 to reach areas of the rooftop otherwise not accessible by auxiliary shafts 30A-30C, thereby assisting in removal of water from various parts and corners of the roof. Flexible conduits 72D, 72E are also provided as being removably attached to axially opposed ends of primary shaft 20. As shown throughout the figures, open ends of all the auxiliary shafts 30 and primary shaft 20 may be closed off with corresponding caps threadably mated thereto respectively.

The manifold 10 may further include a flexible primary conduit 76 removably attached directly to the primary shaft 20 to thereby receive and channel fluid away from the primary shaft 20. Such a flexible primary conduit 76 may advantageously direct water into vertical sections of the gutter system to further assist in quickly removing water from the roof. Also, a discharge nozzle 74 may be included and coupled to the primary conduit 20 to thereby outwardly distribute the fluid in a diverging pattern away from the primary shaft 20. This may be used to expel water from the roof, and may provide the benefit of allowing the user to direct water to desired areas, such as to plants or flowers beneath the eaves of the roof that would otherwise not receive water during rainfall.

The present invention may further include a method for channeling water and debris downwardly from a roof into an existing gutter. Such a method may include the chronological steps of first providing a primary shaft 20 including a first passageway. Second, the method may include providing and removably coupling a plurality of outwardly flanged auxiliary shafts 30 to the primary shaft 20. Next, the method may include arranging the auxiliary shafts 30 in such a manner that each of the auxiliary shafts 30 has a linear longitudinal length registered along a unique axis that is coplanar with a central portion of the primary shaft 20. Finally, the method may include: when at least one of the auxiliary shafts 30 is clogged with debris, redirecting a concentrated stream of fluid to the primary shaft 20 by redirecting fluid along alternate travel paths that are transversely bridged between the auxiliary shafts 30. The first passageway may be registered transversely to the respective longitudinal lengths of the auxiliary shafts 30.

The method combined with the present invention 10 provides the unexpected and unpredictable benefit of permitting a user to easily remove water from a rooftop before damage is caused by excessive water accumulation. The auxiliary shafts 30 may advantageously gather water from remote locations on the rooftop and direct the water toward the primary shaft 20 to be dispersed in the gutter system. The fluid transfer shafts 42, 44 may assist in directing water from one auxiliary shaft to another at times when debris has blocked the least one of the auxiliary shafts 30, and the access panels 70 may permit a user to quickly remove the debris without dismantling the apparatus 10. The important features provide benefits not rendered obvious by one skilled in the art.

While the invention has been described with respect to a certain specific embodiment, it will be appreciated that many modifications and changes may be made by those skilled in the art without departing from the spirit of the invention. It is intended, therefore, by the appended claims to cover all such modifications and changes as fall within the true spirit and scope of the invention.

In particular, with respect to the above description, it is to be realized that the optimum dimensional relationships for the parts of the present invention may include variations in size, materials, shape, form, function and manner of operation. The assembly and use of the present invention are deemed readily apparent and obvious to one skilled in the art.

What is claimed as new and what is desired to secure by Letters Patent of the United States is:

1. A portable fluid draining manifold positional on a roof for channeling water and debris downwardly into an existing gutter, said fluid draining manifold comprising:

a primary shaft including a first passageway, said first passageway being longitudinally oriented along an entirely unobstructed longitudinal length of said primary shaft;

a plurality of outwardly flanged auxiliary shafts removably coupled to said primary shaft, each of said auxiliary shafts having a linear longitudinal length registered along a unique axis that is coplanar with a central portion of said primary shaft; and means for redirecting fluid along alternate travel paths that are transversely bridged between said auxiliary shafts such that a concentrated stream of fluid is redirected to said primary shaft when at least one of said auxiliary shafts is clogged with debris;

wherein said auxiliary shafts converge towards said primary shaft such that the concentrated stream of fluid is centrally deposited at a central portion of said primary shaft;

wherein said auxiliary shafts comprise first, second and third auxiliary shafts defining first, second and third auxiliary passageways leading towards said first passageway;

wherein said fluid redirecting means comprises a primary valve intermediately situated at said primary shaft and located downstream of said first passageway;

first, second and third auxiliary valves situated within proximal ends of said first, second and third auxiliary passageways respectively and being disposed upstream of said first passageway;

a first fluid transfer shaft connected to said first and second auxiliary shafts respectively, said first fluid transfer shaft being spaced from said third auxiliary shaft; and a second fluid transfer shaft connected to said second and third auxiliary shafts respectively, said second fluid transfer shaft being spaced from said first auxiliary shaft;

wherein said first and second fluid transfer shafts define first and second fluid transfer passageways that selectively redirect fluid between said first, second and third auxiliary shafts prior to reaching said primary shaft;

wherein each of said first, second and third auxiliary valves are equally tensioned when adapted between open and closed positions respectively.

2. The fluid draining manifold of claim 1, wherein a first travel path of said alternate travel paths terminates prior to reaching a distal portion of said first auxiliary shaft such that fluid is redirected to a proximal portion of said second auxiliary shaft prior to reaching said primary shaft.

3. The fluid draining manifold of claim 1, wherein a second travel path of said alternate travel paths terminates prior to reaching a distal portion of said second auxiliary shaft such that fluid is redirected to proximal portions of said first and third auxiliary shafts prior to reaching said primary shaft.

4. The fluid draining manifold of claim 1, wherein a third travel path of said alternate travel paths terminates prior to reaching a distal portion of said third auxiliary shaft such that fluid is redirected to a proximal portion of said second auxiliary shaft prior to reaching said primary shaft.

5. The fluid draining manifold of claim 1, wherein each of said first, second and third auxiliary shafts comprises: an access panel located at a distal end thereof for permitting a user to access and remove debris from said first, second and third passageways during periodic maintenance respectively.

6. The apparatus of claim 1, wherein each of said first, second and third auxiliary shafts is removably and independently coupled to said primary shaft.

7. The apparatus of claim 1, further comprising:
a plurality of flexible auxiliary conduits removably attached directly to proximal ends of said auxiliary shafts to thereby receive and channel fluid directly to said auxiliary shafts respectively;
a flexible primary conduit removably attached directly to said primary shaft to thereby receive and channel fluid away from said primary shaft; and
a discharge nozzle coupled to said primary conduit to thereby outwardly distribute the fluid in a diverging pattern away from said primary shaft.

8. A portable fluid draining manifold positional on a roof for channeling water and debris downwardly into an existing gutter, said fluid draining manifold comprising:
a primary shaft including a first passageway;
a plurality of outwardly flanged auxiliary shafts removably coupled to said primary shaft, each of said auxiliary shafts having a linear longitudinal length registered along a unique axis that is coplanar with a central portion of said primary shaft; and
means for redirecting fluid along alternate travel paths that are transversely bridged between said auxiliary shafts such that a concentrated stream of fluid is redirected to said primary shaft when at least one of said auxiliary shafts is clogged with debris;
wherein said first passageway is registered transversely to the respective longitudinal lengths of said auxiliary shafts;
wherein said auxiliary shafts converge towards said primary shaft such that the concentrated stream of fluid is centrally deposited at a central portion of said primary shaft;
wherein said auxiliary shafts comprise first, second and third auxiliary shafts defining first, second and third auxiliary passageways leading towards said first passageway;
wherein said fluid redirecting means comprises
a primary valve intermediately situated at said primary shaft and located downstream of said first passageway;
first, second and third auxiliary valves situated within proximal ends of said first, second and third auxiliary passageways respectively and being disposed upstream of said first passageway;
a first fluid transfer shaft connected to said first and second auxiliary shafts respectively, said first fluid transfer shaft being spaced from said third auxiliary shaft; and
a second fluid transfer shaft connected to said second and third auxiliary shafts respectively, said second fluid transfer shaft being spaced from said first auxiliary shaft;
wherein said first and second fluid transfer shafts define first and second fluid transfer passageways that selectively redirect fluid between said first, second and third auxiliary shafts prior to reaching said primary shaft;
wherein each of said first, second and third auxiliary valves are equally tensioned when adapted between open and closed positions respectively.

9. The fluid draining manifold of claim 8, wherein said auxiliary shafts comprise:
first, second and third auxiliary shafts defining first, second and third auxiliary passageways leading towards said first passageway.

10. The fluid draining manifold of claim 9, wherein said fluid redirecting means comprises:
a primary valve intermediately situated at said primary shaft and located downstream of said first passageway;
first, second and third auxiliary valves situated within proximal ends of said first, second and third auxiliary passageways respectively and being disposed upstream of said first passageway;
a first fluid transfer shaft connected to said first and second auxiliary shafts respectively, said first fluid transfer shaft being spaced from said third auxiliary shaft; and
a second fluid transfer shaft connected to said second and third auxiliary shafts respectively, said second fluid transfer shaft being spaced from said first auxiliary shaft;
wherein said first and second fluid transfer shafts define first and second fluid transfer passageways that selectively redirect fluid between said first, second and third auxiliary shafts prior to reaching said primary shaft.

11. The fluid draining manifold of claim 10, wherein a first travel path of said alternate travel paths terminates prior to reaching a distal portion of said first auxiliary shaft such that fluid is redirected to a proximal portion of said second auxiliary shaft prior to reaching said primary shaft.

12. The fluid draining manifold of claim 10, wherein a second travel path of said alternate travel paths terminates prior to reaching a distal portion of said second auxiliary shaft such that fluid is redirected to proximal portions of said first and third auxiliary shafts prior to reaching said primary shaft.

13. The fluid draining manifold of claim 10, wherein a third travel path of said alternate travel paths terminates prior to reaching a distal portion of said third auxiliary shaft such that fluid is redirected to a proximal portion of said second auxiliary shaft prior to reaching said primary shaft.

14. The fluid draining manifold of claim 9, wherein each of said first, second and third auxiliary shafts comprises: an access panel located at a distal end thereof for permitting a user to access and remove debris from said first, second and third passageways during periodic maintenance respectively.

15. The apparatus of claim 9, wherein each of said first, second and third auxiliary shafts is removably and independently coupled to said primary shaft.

16. The apparatus of claim 8, further comprising:
a plurality of flexible auxiliary conduits removably attached directly to proximal ends of said auxiliary shafts to thereby receive and channel fluid directly to said auxiliary shafts respectively;
a flexible primary conduit removably attached directly to said primary shaft to thereby receive and channel fluid away from said primary shaft; and
a discharge nozzle coupled to said primary conduit to thereby outwardly distribute the fluid in a diverging pattern away from said primary shaft.

* * * * *